United States Patent
Kiuchi

(10) Patent No.: US 9,120,480 B2
(45) Date of Patent: Sep. 1, 2015

(54) BATTERY WARM-UP APPARATUS OF HYBRID ELECTRIC VEHICLE

(75) Inventor: Tatsuo Kiuchi, Kawasaki (JP)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/990,368

(22) PCT Filed: Nov. 28, 2011

(86) PCT No.: PCT/JP2011/077386
§ 371 (c)(1),
(2), (4) Date: May 29, 2013

(87) PCT Pub. No.: WO2012/073890
PCT Pub. Date: Jun. 7, 2012

(65) Prior Publication Data
US 2013/0253748 A1    Sep. 26, 2013

(30) Foreign Application Priority Data

Nov. 30, 2010 (JP) .................. 2010-266582

(51) Int. Cl.
*B60W 20/00* (2006.01)
*B60K 6/48* (2007.10)
(Continued)

(52) U.S. Cl.
CPC .................. *B60W 20/00* (2013.01); *B60K 6/48* (2013.01); *B60L 7/14* (2013.01); *B60L 11/14* (2013.01);
(Continued)

(58) Field of Classification Search
CPC .......................... Y02T 10/7005; B60W 10/08
USPC .......................................................... 318/139
See application file for complete search history.

(56) References Cited

U.S. PATENT DOCUMENTS 6,118,237 A * 9/2000 Kikuchi et al. ............... 318/139
6,583,592 B2 * 6/2003 Omata et al. .................. 318/139
(Continued)

FOREIGN PATENT DOCUMENTS

CN    101000972 A    7/2007
CN    101397008 A    4/2009
(Continued)

OTHER PUBLICATIONS

Written Opinion (PCT/ISA/237) dated Dec. 27, 2011 (four (4) pages).
(Continued)

*Primary Examiner* — John R Olszewski
*Assistant Examiner* — Jason Roberson
(74) *Attorney, Agent, or Firm* — Crowell & Moring LLP

(57) ABSTRACT

A hybrid electric vehicle includes a wet clutch device that establishes and interrupts a connection between an engine and an electric motor, and a transmission switchable between a driving range in which driving force can be transmitted to driving wheels and a non-driving range in which transmission of the driving force is interrupted. When a battery temperature is greater than a warm-up determination value while the vehicle is at a standstill with the transmission switched to the non-driving range, the wet clutch device is kept disengaged. When the battery temperature is less than the warm-up determination value, a battery warm-up control unit switches the wet clutch device into engaged state to connect the engine and the electric motor together and vary driving force of the electric motor alternately to a positive side and a negative side so as to repeatedly charge and discharge the battery.

4 Claims, 3 Drawing Sheets

(51) Int. Cl.
*B60L 11/14* (2006.01)
*B60W 10/02* (2006.01)
*B60W 10/26* (2006.01)
*B60W 10/06* (2006.01)
*B60W 10/08* (2006.01)
*B60L 7/14* (2006.01)
*B60L 11/18* (2006.01)
*F16H 3/00* (2006.01)

(52) U.S. Cl.
CPC ......... *B60L 11/1872* (2013.01); *B60L 11/1875* (2013.01); *B60W 10/02* (2013.01); *B60W 10/023* (2013.01); *B60W 10/06* (2013.01); *B60W 10/08* (2013.01); *B60W 10/26* (2013.01); *B60L 2210/40* (2013.01); *B60L 2240/12* (2013.01); *B60L 2240/441* (2013.01); *B60L 2240/545* (2013.01); *B60W 2510/246* (2013.01); *B60W 2600/00* (2013.01); *B60W 2710/023* (2013.01); *B60W 2710/246* (2013.01); *F16H 3/006* (2013.01); *Y02T 10/6221* (2013.01); *Y02T 10/6286* (2013.01); *Y02T 10/70* (2013.01); *Y02T 10/7005* (2013.01); *Y02T 10/705* (2013.01); *Y02T 10/7077* (2013.01); *Y02T 10/7241* (2013.01); *Y10S 903/93* (2013.01)

(56) References Cited

U.S. PATENT DOCUMENTS

| | | | |
|---|---|---|---|
| 6,664,651 B1 * | 12/2003 | Kotre et al. | 290/29 |
| 7,015,676 B2 | 3/2006 | Kohama et al. | |
| 7,691,027 B2 * | 4/2010 | Soliman et al. | 477/5 |
| 7,810,593 B2 | 10/2010 | Kiuchi | |
| 2011/0174558 A1 | 7/2011 | Tanba et al. | |

FOREIGN PATENT DOCUMENTS

| | | |
|---|---|---|
| JP | 2000-23307 A | 1/2000 |
| JP | 2003-79005 A | 3/2003 |
| JP | 2003-272712 A | 9/2003 |
| JP | 2005-329813 A | 12/2005 |
| JP | 2006-125218 A | 5/2006 |
| JP | 2007-216762 A | 8/2007 |
| JP | 2008-42980 A | 2/2008 |
| JP | 2009-262578 A | 11/2009 |

OTHER PUBLICATIONS

International Search Report dated Dec. 27, 2011 with English translation (Four (4) pages).
Japanese Office Action dated Aug. 27, 2014 (three pages).
Chinese Office Action dated Mar. 27, 2015, with partial English translation (Ten (10) pages).

* cited by examiner

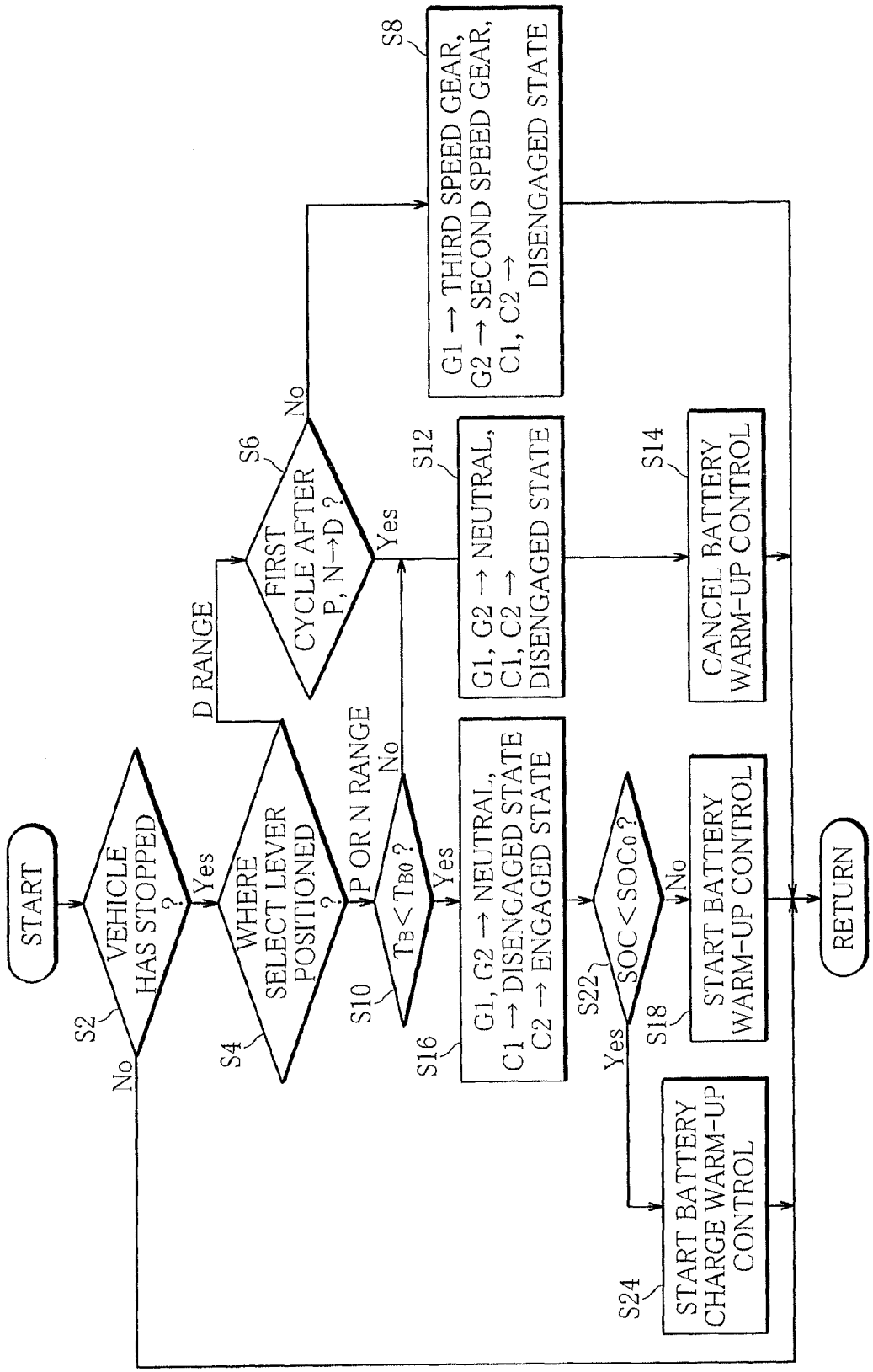

BATTERY WARM-UP APPARATUS OF HYBRID ELECTRIC VEHICLE

TECHNICAL FIELD

Exemplary embodiments of the present invention relate to a hybrid electric vehicle powered by an engine and an electric motor, and in particular to a battery warm-up apparatus that prevents degradation in the charge-discharge performance of a travelling battery.

BACKGROUND OF THE INVENTION

In recent years, hybrid electric vehicles of various types, such as a series type and a parallel type, have been put into practical use. In such hybrid electric vehicles, electrical power supplied from a travelling battery causes an electric motor to act as a motor to move the vehicle, while the electric motor is caused to act as a generator using SOC (state of charge), which indicates the remaining capacity of a battery, as an indicator, and the battery is charged with power generated by the electric motor so that SOC can be maintained in a predetermined range. Thus, the travelling performance of a vehicle using an electric motor is greatly influenced by the charge-discharge performance of a battery, and various measures have been taken so that the battery can deliver excellent charge-discharge performance.

One of major factors that cause degradation in the charge-discharge performance of a battery is temperature decrease. For this reason, to realize excellent charge-discharge performance, it is especially effective to actively warm up a battery when the temperature of the battery decreases in a cold climate area or the like.

From this standpoint, various measures have been proposed so as to warm up a battery (see, for example, Japanese Laid-Open Patent Publication (Kokai) No. 2003-272712). Japanese Laid-Open Patent Publication (Kokai) No. 2003-272712 describes a series hybrid electric vehicle powered by an electric motor acting as a motor using electricity from a generator driven by an engine, and in which when the temperature of a travelling battery decreases, the battery is charged and discharged repeatedly in short cycles within a predetermined SOC range so as to increase the temperature of the battery.

SUMMARY OF THE INVENTION

Battery warm-up control is needed much more when the vehicle is at a standstill than when the vehicle is running. Specifically, when a vehicle is running, an electric motor acts as a motor (powering control), or the electric motor acts as a generator (regeneration control) according to running conditions of the vehicle, and accordingly, the battery is charged and discharged to voluntarily increase in temperature, and hence active warm-up control is not much needed even in a cold climate area or the like. On the other hand, when a vehicle is at a standstill, a battery is not charged or discharged due to halting of an electric motor, and hence the temperature of the battery does not voluntarily increase, and active warm-up control is needed.

However, when the technique described in Japanese Laid-Open Patent Publication (Kokai) No. 2003-272712 is applied to a parallel hybrid electric vehicle, active warm-up control cannot be carried out when the vehicle is at a standstill, which is a particularly significant problem because this is when battery warm-up is needed.

In a common parallel hybrid electric vehicle (for example, one described in Japanese Laid-Open Patent Publication (Kokai) No. 2007-216762), a clutch is interposed between an engine and an electric motor, and when the clutch is disengaged, the driving force of the electric motor is transmitted to driving wheels, and when the clutch is engaged, the driving force of the engine or driving force of both the engine and the electric motor is transmitted to the driving wheels to move the vehicle.

To carry out warm-up control for the battery while the vehicle is at a standstill, the clutch is engaged to mechanically connect the idling engine and the electric motor together, and in addition, the driving force of the electric motor is varied alternately to a positive side and a negative side. When the driving force is on the negative side, the electric motor acts as a generator, and is rotatably driven by the engine to charge the battery. On the other hand, when the driving force is on the positive side, the electric motor acts as a motor and rotatably drives the engine to discharge the battery. As a result, the battery is charged and discharged repeatedly and warmed up due to temperature increase.

Thus, in the parallel hybrid electric vehicle, the clutch is required to be engaged for battery warm-up control when the vehicle is at a standstill, and a dry clutch or a wet clutch is used as this type of clutch.

A dry clutch using an actuator for switching between engaged state and disengaged state is not mechanistically limited in holding engaged state and unengaged state. For this reason, the clutch is held engaged when the vehicle is at a standstill, and battery warm-up control described above can be started because the clutch has already been engaged with halting of the vehicle.

However, in a wet clutch, hydraulic pressure generated by a hydraulic pump driven by driving force of the engine acts to switch the clutch to an engaged state, and hence while the clutch is held engaged the load on the engine that drives the hydraulic pump continuously increases. Thus, to prevent degradation in fuel economy resulting from an increase in engine load, the clutch is controlled to be held unengaged while a vehicle is at a standstill. For this reason, when the vehicle is at a standstill battery warm-up control cannot be started in this state, and hence the battery cannot be warmed up to recover charge-discharge performance, and by extension travelling performance of the vehicle.

Exemplary embodiments of the present invention solve the above described problems, and provide a battery warm-up apparatus of a hybrid electric vehicle that can properly carry out battery warm-up control when the vehicle is at a standstill, and therefore, reliably increase the temperature of a battery to recover charge-discharge performance.

An aspect of the present invention is directed to a battery warm-up apparatus of a hybrid electric vehicle that includes a wet clutch device configured to establish and interrupt a connection between an engine and an electric motor both serving as a traveling power source; a transmission capable of being switched between a driving range in which driving force of the traveling power source can be transmitted to driving wheels and a non-driving range in which transmission of the driving force to the driving wheels is interrupted; and a battery configured to supply electrical power to the electric motor acting as a motor and to be charged by the electric motor acting as a generator, and in which the wet clutch device is kept disengaged while the vehicle is at a standstill with the transmission switched to the non-driving range, the battery warm-up apparatus for warming up the battery comprising: a battery temperature detecting unit configured for detecting a temperature of the battery; and a battery warm-up control unit configured for, when determining that the temperature of the battery detected by the battery temperature detecting unit is less than a warm-up determination value set in advance while the vehicle is at a standstill with the transmission switched to the non-driving range, switching the wet clutch device into engaged state to connect the engine and the electric motor together, and varying driving force of the electric motor alternately to a positive side and a negative side so as to repeatedly charge and discharge the battery.

In the hybrid electric vehicle, the wet clutch device may include a first clutch and a second clutch connected in parallel to the engine, the transmission may be a dual-clutch transmission including a first shifting mechanism and a second shifting mechanism connected to the first clutch and the second clutch, respectively, and the electric motor may be interposed between the second clutch and the second shifting mechanism. In this case, when the vehicle is at a standstill with the transmission switched to the non-driving range, the first clutch and the second clutch are held in disengaged state. In the battery warm-up apparatus of the hybrid electric vehicle configured in this manner, when the temperature of the battery is judged to be less than the warm-up determination value while the vehicle is at a standstill with the transmission switched to the non-driving range, the battery warm-up control unit switches only the second clutch to engaged state and varies the driving force of the electric motor to the positive side and the negative side.

The battery warm-up apparatus of the hybrid electric vehicle may further comprise a battery remaining capacity detecting unit configured for detecting a remaining capacity of the battery, wherein, when the remaining capacity of the battery detected by the battery remaining capacity detecting unit is judged to be less than a lower limit determination value set in advance, the battery warm-up control unit may prohibit the driving force of the electric motor from varying to the positive side, and continuously control the driving force of the electric motor to the negative side to charge the battery.

When the temperature of the battery is judged to be less than the warm-up determination value while the vehicle is at a standstill with the transmission switched to the non-driving range, the battery warm-up control unit may control the engine such that a rotation speed of the engine becomes equal to a target rotation speed set based on an idle speed of the engine.

In this case, the battery warm-up control unit may set the target rotation speed to the idle speed, for example.

Alternatively, the battery warm-up control unit may set the target rotation speed at which the driving force of the electric motor is varied to the negative side so as to be equal to a rotation speed higher than the idle speed, or may set the target rotation speed at which the driving force of the electric motor is varied to the positive side so as to be equal to a rotation speed lower than the idle speed.

As described above, in the battery warm-up apparatus of the hybrid electric vehicle according to the present invention, the wet clutch device is kept disengaged while the vehicle is at a standstill with the transmission switched to the non-driving range, and on the other hand, when the temperature of the battery becomes less than the warm-up determination value, the battery warm-up control unit switches the wet clutch device into engaged state to connect the engine and the electric motor together, and varies the driving force of the electric motor alternately to the positive side and the negative side so as to repeatedly charge and discharge the battery.

The wet clutch device is switched to engaged state through action of hydraulic pressure, but when the vehicle is at a standstill, hydraulic pressure does not have to act because the wet clutch device is held unengaged. This can prevent degradation in fuel economy caused by an increase in load on the engine, which drives a hydraulic pump. On the other hand, when the temperature of the battery is low, the battery warm-up control unit switches the wet clutch device into engaged state to connect the engine and the electric motor together, thus enabling battery warm-up control for warming up the battery to be properly executed by varying the driving force of the electric motor alternately to the positive side and the negative side so as to repeatedly charge and discharge the battery. As a result, the charge-discharge performance of the battery can be reliably recovered.

In the hybrid electric vehicle described above, where the wet clutch device includes a first clutch and a second clutch connected in parallel to the engine and the transmission is a dual-clutch transmission including a first shifting mechanism connected to the first clutch and a second shifting mechanism connected to the second clutch, the electric motor may be interposed between the second clutch and the second shifting mechanism. In this case, when the vehicle is at a standstill with the transmission switched to the non-driving range, the first clutch and the second clutch are held in disengaged state, and when the temperature of the battery is low, the battery warm-up control unit switches only the second clutch into engaged state to vary the driving force of the electric motor.

Thus, because only the second clutch required for warm-up control of the battery is engaged and the first clutch is held unengaged, load on the engine for driving the hydraulic pump and consequent fuel consumption by the engine can be minimized.

In the battery warm-up apparatus, when the remaining capacity of the battery is less than the lower limit determination value, the battery warm-up control unit may prohibit the driving force of the electric motor from varying to the positive side and continuously control the driving force of the electric motor to the negative side to charge the battery.

Therefore, even when the remaining capacity of the battery is small, the battery can be charged to be warmed up. Moreover, when driving of the vehicle is to be restarted, the battery has a sufficient remaining capacity, and thus it is possible to respond accurately to requests in travel using the electric motor.

When carrying out the battery warm-up control as described above, the battery warm-up control unit may control the engine such that the rotation speed of the engine becomes equal to the target rotation speed set based on the idle speed of the engine.

In this case, the battery warm-up control unit may set the target rotation speed at which the driving force of the electric motor is varied to the negative side so as to be equal to a rotation speed higher than the idle speed, whereby the amount of electrical power generated by the electric motor acting as a generator is increased, so that the amount of charge of the battery per unit time increases. On the other hand, the battery warm-up control unit may set the target rotating speed at which the driving force of the electric motor is varied to the positive side so as to be equal to a rotation speed lower than the idle speed, whereby the amount of electrical power consumed by the electric motor acting as a motor is increased, so that the amount of discharge of the battery per unit time increases. Thus, by increasing at least one of the amount of charge and the amount of discharge of the battery per unit time, it is possible to warm up the battery more quickly.

BRIEF DESCRIPTION OF THE DRAWINGS

FIG. 3 is a flowchart of a warm-up control routine executed by an ECU in another example.

MODE FOR CARRYING OUT THE INVENTION

A description will now be given of one embodiment in which the present invention is embodied into a battery warm-up apparatus of a hybrid electric vehicle having a dual-clutch transmission.

Figure 1:
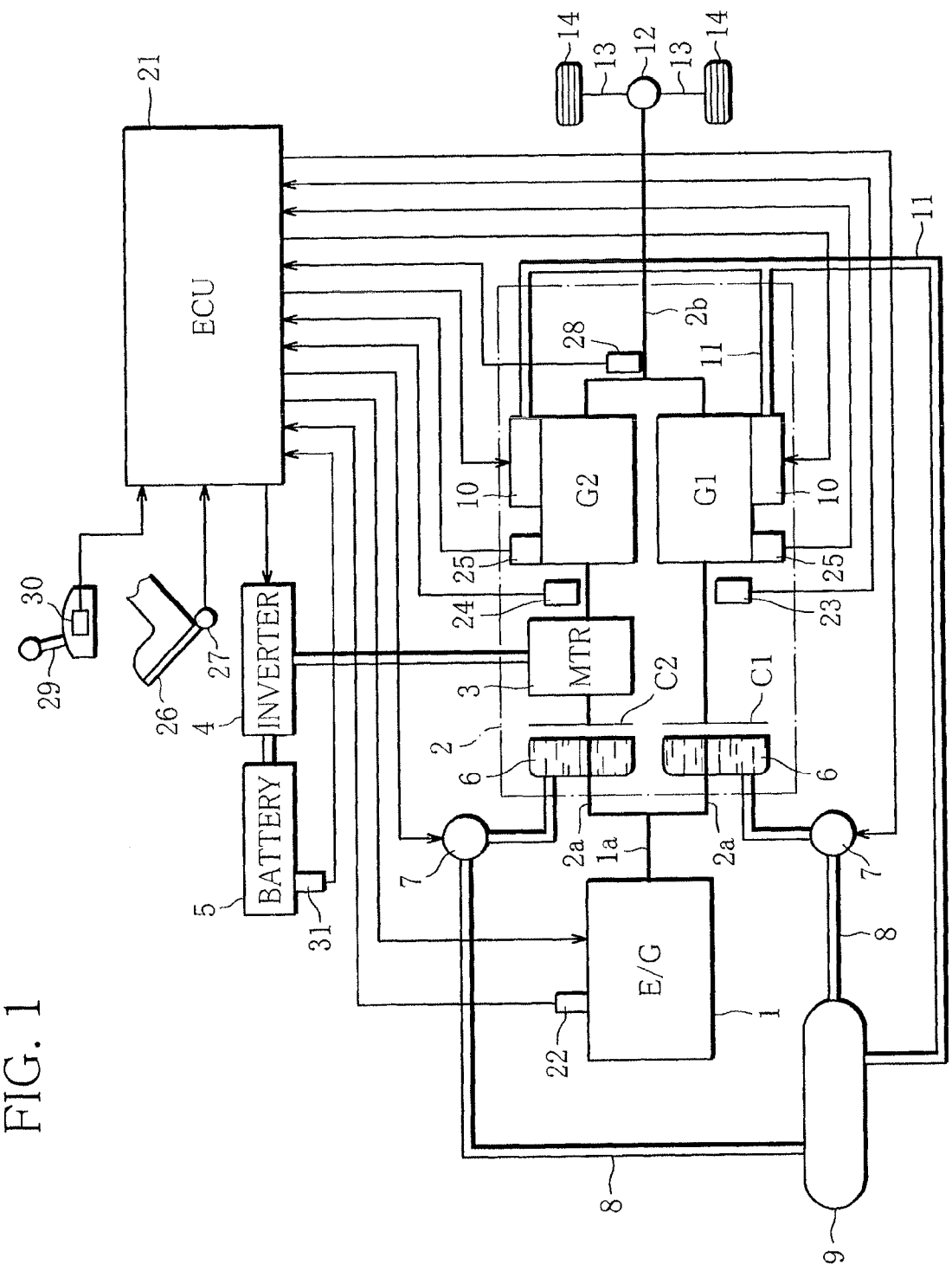
FIG. 1 is a diagram showing an overall arrangement of a battery warm-up apparatus of a hybrid electric vehicle according to one embodiment of the present invention.

FIG. 1 is a diagram showing an overall arrangement of the battery warm-up apparatus of the hybrid electric vehicle according to the present embodiment. The vehicle is equipped with a diesel engine (hereafter referred to as the engine) 1 as a traveling power source. The engine 1 is configured as a so-called common rail type engine that supplies high-pressure fuel, which is accumulated in a common rail by a pressure pump, to fuel injection valves of respective cylinders, and injects the fuel into the cylinders in response to opening of the fuel injection valves.

An output shaft 1a of the engine 1 is projected rearward in the vehicle 1 from the engine 1, and connected to an input shaft 2a of an automatic transmission (hereafter referred to merely as the transmission) 2. The transmission 2 has six forward gears (first to sixth speed gears) and one reverse gear, and driving power of the engine 1 is input to the transmission 2 via the input shaft 2a, and then output from an output shaft 2b through a selected gear. The driving power is transmitted from the output shaft 2b to right and left driving wheels 14 via a differential unit 12 and respective drive shafts 13.

It goes without saying that gears of the transmission 2 are not limited to the above-mentioned ones, but may be arbitrarily changed.

The transmission 2 is configured as a so-called dual clutch transmission, and has therein an electric motor 3 as a traveling power source. The details of the dual clutch transmission are described in, for example, Japanese Laid-Open Patent Publication (Kokai) No. 2009-035168, and therefore, only the outline of the dual clutch transmission will be explained. For this reason, in FIG. 1, the transmission 2 is depicted in schematic form different from an actual mechanism, and in the following description as well, an arrangement and operation of the transmission 2 will be conceptually described.

As well known, the dual clutch transmission is a system in which odd-number gears and even-number gears are provided as transmission systems independent of each other, and when one of the transmission systems is transmitting driving power, gear shifting to a next expected gear is performed in the other one of the transmission systems in advance, so that shift to the next gear can be completed without interrupting power transmission.

Specifically, as shown in FIG. 1, the transmission 2 has a clutch C1 (first clutch) and a clutch C2 (second clutch), and the clutches C1, C2 are connected in parallel to the output shaft 1a of the engine 1 via the input shaft of the transmission 2. An odd-number gear mechanism G1 (first shifting mechanism) comprised of odd-number gears (the first, third, and fifth speed gears) is connected to the clutch C1, and an even-number gear mechanism G2 (second shifting mechanism) comprised of even-number gears (the second, fourth, and sixth speed gears) is connected to the clutch C2 via the electric motor 3. Output sides of the gear mechanisms G1 and G2 are connected to the above-mentioned common output shaft 2b. It should be noted that in FIG. 1, the reverse gear is omitted for the convenience of explanation.

Although not illustrated, the electric motor 3 is comprised of a rotor and a stator doubly disposed on an inner side and an outer side, and a rotary shaft rotatably supporting the rotor is connected to an output side of the clutch C2. A travelling battery 5 is electrically connected to the electric motor 3 via an inverter 4, and as will be described later, the inverter 4 carries out powering control and regeneration control of the electric motor 3.

Specifically, in powering control, direct-current power stored in a battery 5 is converted to alternating-current power by the inverter 4 and supplied to the electric motor 3, which in turn acts as a motor and inputs driving force to the even-number gear mechanism G2. In regeneration control during vehicle deceleration, the electric motor 3 acts as a generator to regenerate regenerative braking force when it is reversely driven from the driving wheel 14 side, and generated alternating-current power is converted to direct-current power by the inverter 4 to charge the battery 5.

The clutches C1 and C2 are configured as wet multiple-disc clutches, and a hydraulic chamber 6 is formed integrally with each of the clutches C1 and C2. Each hydraulic chamber 6 is connected to an oil pan 9 via an oil path 8 in which a corresponding electromagnetic valve 7 is placed, and hydraulic oil stored in the oil pan 9 is supplied as hydraulic oil with a predetermined pressure from a hydraulic pump, not shown, driven by the engine 1. When the electromagnetic valve 7 is opened, hydraulic oil is supplied from the oil pan 9 to the corresponding hydraulic chamber 6 through the corresponding oil path, and the corresponding clutch C1 or C2 is switched from unengaged state to engaged state due to the oil pressure in the corresponding hydraulic chamber 6.

On the other hand, when the electromagnetic valve 7 is closed, the hydraulic pressure in the corresponding hydraulic chamber 6 lowers due to the supply of hydraulic oil being stopped, and the corresponding clutch C1 or C2 is switched from engaged state to unengaged state by a pressure spring, not shown.

The odd-number gear mechanism G1 and the even-number gear mechanism G2 are provided with respective gear shift units 10. Although not illustrated, each of the gear shift units 10 has therein a plurality of hydraulic cylinders, which operate shift forks corresponding to the gears of the odd-number gear mechanism G1 and the even-number gear mechanism G2, and a plurality of electromagnetic valves, which operate the respective hydraulic cylinders. The gear shift units 10 are connected to the oil pan 9 via an oil path 11, and in response to opening and closing of the electromagnetic valves, hydraulic oil from the oil pan 9 is supplied to the corresponding hydraulic cylinders to cause switching of the shift forks, which causes the corresponding gear mechanism G1 or G2 to change gears to select a gear.

In a vehicle interior, an ECU (control unit) 21 having an input-output device, storage devices (a ROM, a RAM, or the like) for storage of control programs, control maps, and so on, a central processing unit (CPU), timer counters, and others, which are not shown, is installed. The ECU 21 performs general control over the engine 1, transmission 2, electric motor 3, and clutches C1 and C2.

Sensors such as an engine rotation speed sensor 22 that detects an engine rotation speed Ne of the engine 1, a clutch rotation speed sensor 23 that detects a clutch rotation speed Nc1 of an output side of the clutch C1, a clutch rotation speed sensor 24 that detects a clutch rotation speed Nc2 of an output side of the clutch C2 (=rotation speed of the electric motor 3), a gear position sensor 25 that detects a selected of the gear mechanisms G1 and G2, an accelerator position sensor 27 that detects an accelerator position $\theta acc$ of an accelerator pedal 26, a vehicle speed sensor 28 that is provided on the output shaft 2b of the transmission 2 and detects a vehicle speed V, a lever position sensor 30 that detects an operation position of a select lever 29 provided near a driver's seat, and a temperature sensor 31 (battery temperature detecting unit) that detects a temperature $T_B$ of the battery 5 are connected to an input side of the ECU 21.

The above-mentioned inverter 4, electromagnetic valves 7 of the clutches C1 and C2, electromagnetic valves of the gear shift units 10, and so on are connected to an output side of the ECU 21, and also, the pressure pump for pressurizing fuel that is accumulated in the common rail, the fuel injection valves of the cylinders, and so on are connected to the output side of the ECU 21 although they are not illustrated. It should be noted that the ECU 21 alone should not necessarily perform comprehensive control, but another ECU designed for exclusive use in engine control may be provided separately from the ECU 21.

Based on detection information such as the accelerator position θacc detected by the accelerator position sensor 27 and the vehicle speed V detected by the vehicle speed sensor 28, the ECU 21 calculates driver's requested torque as a positive value when the vehicle is accelerating or running at a constant speed, and as a negative value when the vehicle is decelerating. Then, based on the calculated driver's requested torque, vehicle driving condition, operating states of the engine 1 and the electric motor 3, SOC (remaining capacity) of the battery 5, or the like, the ECU 21 selects a driving mode (driving only by engine, driving only by electric motor, or driving by both engine and electric motor), and based on the selected driving mode, operates the engine 1 and the electric motor 3 so as to attain the requested torque, and executes gear shift control of the transmission 2.

For example, when the SOC of the battery 5 extremely decreases and it is thus impossible for the electric motor 3 to properly work (low-SOC state), the ECU 21 selects driving only by engine as the driving mode. In the driving only by engine, one of the clutches C1 and C2 is engaged to transmit driving force of the engine 1 to the driving wheels 14 via any corresponding gear of the corresponding gear mechanisms G1 and G2, thus causing the vehicle to run.

When the SOC of the battery 5 is less than a predetermined value and not sufficient (intermediate SOC state), or when the requested torque is not less than a predetermined value, the ECU 21 selects driving by both engine and electric motor as the driving mode. In the driving by both engine and electric motor, one of the clutches C1 and C2 is engaged to transmit driving force of the engine 1 to the driving wheels 14 as in the case of the driving only by engine, and at the same time, the electric motor 3 is caused to run as a motor.

Thus, when the clutch C1 is engaged, driving force of the engine 1 transmitted via the odd-number gear mechanism G1 and driving force of the electric motor 3 via the even-number gear mechanism G2 are merged together and then transmitted to the driving wheels 14. When the clutch C21 is engaged, both driving force of the engine 1 and driving force of the electric motor 3 are transmitted to the driving wheels 14 via the even-number gear mechanism G2.

When, for example, the SOC of the battery 5 is not less than a predetermined value and is sufficient (high SOC state), and the requested torque is less than a predetermined value, the ECU 21 selects driving only by electric motor as the driving mode. In the driving only by electric motor, both the clutches C1 and C2 are disengaged and the electric motor 3 is caused to run as a motor. This transmits driving force of the electric motor 3 to the driving wheels 14 via any gear of the even-number gear mechanism G2. It should be noted that although in the present embodiment, the engine 1 is kept idling at this time, this is not limitative, but the engine 1 may be temporarily stopped.

The gear shift control of the transmission 2 is executed to select a gear that is actually used for transmitting driving force to the driving wheel side based on a target gear obtained from a predetermined shift map, and in a dual-clutch transmission, shifting to a next gear predicted based on, for example, vehicle acceleration/deceleration is carried out in advance of shift to the target gear (this operation will hereafter be referred to as pre-shift). The shift control carried out at this time is described in, for example, Japanese Laid-Open Patent Publication (Kokai) No. 2009-035168 mentioned above, and hence detailed description thereof is omitted, but for example, during vehicle acceleration, a higher-speed gear next to the present gear currently transmitting power is predicted as a next gear first, and then, based on a request for pre-shift to the next gear, shifting to the next gear is performed in advance in one of the gear mechanisms G1 and G2 which is suspending power transmission.

After that, when the vehicle speed V increasing with vehicle acceleration exceeds a line of shift-up to the next gear on the shift map, the target gear is changed from the present gear to the next gear, and then the engagement/disengagement state of the clutches C1 and C2 are reversed to attain the target gear. Because shifting to the next gear is completed by carrying out such pre-shift, gear shifting can be completed only by reversing the engagement/disengagement state of the clutches C1 and C2 without the need of suspending power transmission.

The battery 5 tends to rapidly degrade in terms of charge-discharge performance as temperature decreases, and it is thus necessary to positively carry out warm-up control for the battery 5 at low temperatures as described in Japanese Laid-Open Patent Publication (Kokai) No. 2003-272712. Such warm-up control is particularly required when the vehicle is at a standstill, that is, the battery 5 is not charged or discharged due to the stop of the electric motor 3. In such warm-up control when the vehicle is at a standstill, it is necessary to connect the engine 1 and the electric motor 3 together via the clutch C2, and vary driving force of the electric motor 3 alternately to a positive side and a negative side so as to charge and discharge the battery 5.

However, to hold the clutch C1 or the clutch C2 engaged, it is necessary to cause hydraulic pressure to continuously act in the corresponding hydraulic chamber 6, and engine load increases due to the need of driving the hydraulic pump. For this reason, when the vehicle is at a standstill, the clutches C1 and C2 are kept unengaged. Thus, as described above, even when the need of carrying out warm-up control for the battery 5, such control cannot be carried out as the situation stands, and hence the battery 5 cannot be warmed up and its charge-discharge performance cannot be recovered.

Accordingly, in the present embodiment, even when the vehicle is at a standstill, clutch control different from that in normal conditions is carried out when warm-up control for the battery 5 is required. A detailed description will now be given of a process carried out by the ECU 21 for this countermeasure.

Figure 2:
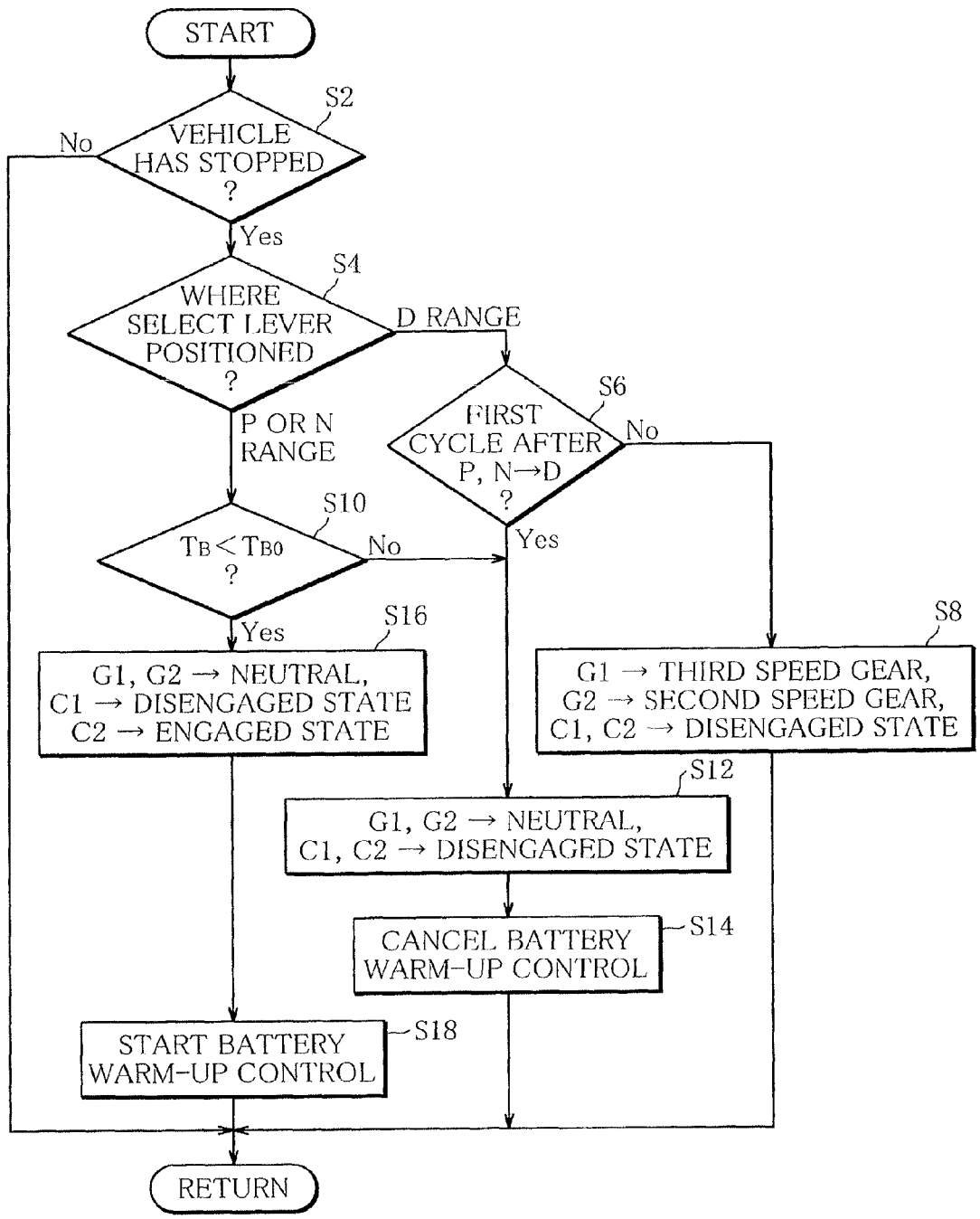
FIG. 2 is a flowchart of a warm-up control routine executed by an electronic control unit (ECU).

When an ignition switch of the vehicle is on, the ECU 21 carries out a battery warm-up control routine in FIG. 2 at predetermined control intervals.

First, the ECU 21 determines in step S2 whether or not the vehicle has stopped based on the vehicle speed V detected by the vehicle speed sensor 28, and if the determination result is NO (negative), the routine is brought to an end on a temporary basis. When the determination result in the step S2 is YES (positive), the ECU 21 determines, in step S4, the operation position of the select lever 29 detected by the lever position sensor 30. When the select lever 29 lies in a D (drive) range which is a driving range, the ECU 21 determines in step S6 whether or not the present cycle is a first cycle of control by the ECU 21 after switching from a P range or an N range to the D range. When, for example, the vehicle has been stopped by braking so as to wait at stoplights, the select lever 29 is kept in the D range from the beginning of the stoppage, and the ECU 21 makes determination of NO in the step S6, and then the ECU 21 executes the process in step S8.

In the step S8, to prepare for gear shift in the transmission 2 after starting, the ECU 21 executes gear shift to the third speed gear in the odd-number gear mechanism G1 and gear shift to the second speed gear, which is the starting gear, in the even-number gear mechanism G2, and the ECU 21 disengages both the clutches C1 and C2. Then, the ECU 21 ends the routine. The disengagement of the clutches C1 and C2 reduces engine load for driving the hydraulic pump while the vehicle is at a standstill, and at the same time, completes preparations for starting the vehicle. Then, when the accelerator pedal is depressed by the driver, the clutch C2 is switched to engaged state, and driving force of the engine 1 increases in response to the accelerator pedal depression, causing the vehicle to start.

It should be noted that on this occasion, shifting to the starting gear should not necessarily done, but for example, the even-number gear mechanism G2 may be held neutral, and at the time of the accelerator pedal depression, shifting to the starting gear may be performed in the even-number gear mechanism G2.

When the ECU 21 determines in the step S4 that the select lever 29 lies in the P range or the N range, the ECU 21 determines in step S10 whether or not the battery temperature $T_B$ detected by the temperature sensor 31 is less than a warm-up determination value $T_{B0}$ set in advance. As the warm-up determination value $T_{B0}$, a temperature close to such a lower limit as not to degrade the charge-discharge performance of the battery 5 due to temperature decrease, and when the determination result in the step S10 is NO, the ECU 21 executes the process in step S12.

For example, when the select lever 29 is switched from the D range to the P range or the N range because the vehicle may be at a standstill for a relatively long period of time due to a traffic jam or the like, and the battery temperature $T_B$ at this time is not less than the warm-up determination value $T_{B0}$ ($T_B \geq T_{B0}$), the ECU 21 executes the process in step 12 after the determinations in the steps S4 and S10. In the step S12, the ECU 21 brings the odd-number gear mechanism G1 and the even-number gear mechanism G2 into neutral, and switches both the clutches C1 and C2 into disengaged state.

In this case as well, the disengagement of the clutches C1 and C2 reduces engine load for driving the hydraulic pump while the vehicle is at a standstill. In the next step S14, the ECU 21 cancels the battery warm-up control. Details of this control will be described below, but when the battery warm-up control has not been started, the ECU 21 directly brings the routine to an end.

On the other hand, when the ECU 21 determines in the step S10 that the battery temperature $T_B$ at this time is less than the warm-up determination value $T_{B0}$ set in advance ($T_B < T_{B0}$), that is, the determination result in the step S10 is YES, in step S16, the ECU 21 brings the odd-number gear mechanism G1 and the even-number gear mechanism G2 into neutral, and switches the clutches C1 and C2 into disengaged state and engaged state, respectively. In the next step S18, the ECU 21 starts the battery warm-up control.

The battery warm-up control is to repeatedly charge and discharge the battery 5 by varying driving force of the electric motor 3 alternately to a positive side and a negative side.

In this case, the engine 1, which is idling, is feedback-controlled using an predetermined idle speed as a target value. For this reason, when the ECU 21 controls the electric motor 3 to generate negative driving force (which decreases the RPM of the engine 1), the electric motor 3 is driven by the engine 1 maintained at the idle speed, and thus the electric motor 3 acts as a generator to generate electrical power. Conversely, when the ECU 21 controls the electric motor 3 to generate positive driving force (which increases the RPM of the engine 1), the electric motor 3 rotatably drives the engine 1 maintained at the idling speed, and thus the electric motor 3 acts as a motor to consume electrical power.

When the electric motor 3 acts as a generator, the generated electrical power is converted to direct-current power by the inverter 4 to charge the battery 5. When the electric motor 3 acts as a motor, direct-current power of the battery 5 is converted to alternating-current power by the inverter 4 and then supplied to the electric motor 3. As a result, the battery 5 is repeatedly charged and discharged, and accordingly, the battery temperature $T_B$ gradually increase (battery warm-up control unit).

In this case, various timings can be set for varying driving force of the electric motor 3. For example, in order that the SOC of the battery 5 can be held inside a predetermined range, for example, a range of 30% to 60%, the battery 5 may be charged by continuously setting driving force of the electric motor 3 on a negative side until the SOC exceeds 60%, and the battery 5 may be discharged by continuously setting driving force of the electric motor 3 on a positive side until the SOC becomes lower than 30%.

Moreover, as described in Japanese Laid-Open Patent Publication (Kokai) No. 2003-272712, when the SOC is less than a predetermined value, for example, 50% when the battery warm-up control is started, the ECU 21 may vary the SOC in a predetermined range less than the predetermined value, and when the SOC is not less than 50% when the battery warm-up control is started, the ECU 21 may vary the SOC in a predetermined range higher than the predetermined value.

It should be noted that the battery warm-up control is not limited to the one described above. For example, when the electric motor 3 acts as a generator, the ECU 21 may set a target idle speed of the engine 1 higher than in normal conditions so as to increase electrical power generated by the electric motor 3. Also, when the electric motor 3 acts as a motor, the ECU 21 may set the target idle speed lower than in normal conditions so as to increase electrical power consumed by the electric motor 3. In this manner, the charge amount of the battery 5 per unit time increases due to the increase of electrical power generated by the electric motor 3, and the discharge amount of the battery 5 per unit time increases due to the increase of the electrical power consumed by the electric motor 3. Thus, the battery temperature $T_B$ can be increased more quickly by increasing the target idle speed when the electric motor acts as a generator and/or by decreasing the target idle speed when the electric motor 3 acts as a motor.

Then, when the driver switches the select lever 29 from the P range or the N range to the D range so as to start the vehicle, the ECU 21 executes the process in the step S6 after making the determination in the step S4. At this time, the present cycle is a first cycle of control by the ECU 21 after switching to the D range, and thus the ECU 21 makes determination of YES in the step S6 and then the ECU 21 executes the process in the step S12. In the step S12, the ECU 21 switches the clutch C2 into the disengaged state, and then the ECU 21 cancels the battery warm-up control in the step S14. When the ECU 21 executes the process in step S6 again in the next cycle, the ECU 21 makes the determination of NO in the step S6 because the cycle is the second cycle, and executes the process in the step S8. In the step S8, the ECU 21 executes shifting to the second speed gear in the even-number gear mechanism G2 in preparation for starting of the vehicle.

As described above, in the present embodiment, either when the select lever 29 lies in the D range or when the temperature $T_B$ of the battery 5 lies inside a normal range ($T_B \geq T_{B0}$) and thus does not affect charge-discharge performance even in the case where the select lever 29 lies in the P range or the N range, both the clutches C1 and C2 are kept disengaged as with the hybrid electric vehicles of the prior art. Thus, in this case, engine load for driving the hydraulic pump while the vehicle is at a standstill can be reduced.

When the vehicle is at a standstill with the select lever 29 lying in the P range or the N range, and the temperature $T_B$ of the battery 5 decreases to less than the warm-up determination value $T_{B0}$ ($T_B < T_{B0}$), which results in affecting charge-discharge performance, the ECU 21 engages the clutch C2 on the electric motor 3 side. Thus, the battery warm-up control to charge and discharge the battery 5 by varying driving force of the electric motor 3 alternately to a positive side and a negative side can be properly carried out, and hence the battery temperature $T_B$ can be reliably increased to recover charge-discharge performance.

Moreover, because at this time, the ECU 21 engages only the clutch 2 required for the battery warm-up control, and the clutch 1 is kept unengaged, the above-described effects can be obtained while minimizing an increase in engine load for driving the hydraulic pump and an increase in fuel consumption due to the increase in engine load.

In the battery warm-up control, the SOC of the battery 5 is maintained in the predetermined range by varying driving force of the electric motor 3 to a positive side and a negative side as described above, but when the SOC is extremely low from the beginning of the battery warm-up control, the battery warm-up control cannot be started as things are, and also, it is necessary to a certain level of SOC of the battery 5 so as to prepare for restart of vehicle travel. A description will now be given of another example where such a case arises.

FIG. 3 is a flowchart of a warm-up control routine executed by the ECU 21 in another example, which differs from FIG. 2 in that steps S22 and S24 are added.

When the ECU 21 determines in the step S10 that the battery temperature $T_B$ is less than the warm-up determination value $T_{B0}$, and switches the clutch C2 into engaged state in the step S16, the ECU 21 determines in the step S22 whether or not the SOC of the battery 5 is less than a charge determination value $SOC_0$ set in advance.

It should be noted that a well-known method can be used to calculate the SOC, and for example, the present SOC is estimated by successively adding up input current in charge of the battery 5 and output current in discharge of the battery 5 (battery remaining capacity detecting unit). As the charge determination value $SOC_0$, a lower limit of the predetermined range in which the SOC of the battery 5 should be maintained by the battery warm-up control is set for example. However, this is not limitative, but another value may be set as the charge determination value $SOC_0$.

When the determination result is NO in the step S22, the ECU 21 carries out the battery warm-up control in the step S18 as in the above described embodiment. When the determination result is YES in the step S22, the ECU 21 carries out the battery charge warm-up control in the step S24. In this control, the ECU 21 prohibits driving force of the electric motor 3 from varying to a positive side, and continuously control the driving force of the electric motor 3 to a negative side. As a result, the electric motor 3 continuously runs as a generator, and electrical power generated as a result charges the battery 5, so that the SOC of the battery 5 quickly increases, and the battery temperature $T_B$ increases.

Then, when the SOC becomes equal to or greater than the charge determination value $SOC_0$, the ECU 21 executes the process in the step S18 after making the determination in the step S22. In the step S18, the ECU 21 switches the control from the battery charge warm-up control to the battery warm-up control. After that, driving force of the electric motor 3 is alternatively varied to a positive side and a negative side to repeatedly charge and discharge the battery 5, and as a result, the battery temperature $T_B$ further increases to recover the charge-discharge performance of the battery 5.

It should be noted that, when the select lever 29 is switched to the D range during the battery charge warm-up control, the ECU 21 executes the process in the step S12 and then cancels the battery charge warm-up control in the step S14 as in the case of the battery warm-up control.

As described above, in the present example, when the SOC of the battery 5 is low, the battery charge warm-up control is carried out first, and the battery 5 is continuously charged to increase the SOC. Thus, even when the actual SOC of the battery 5 is extremely lower than the predetermined range in which the SOC should be maintained by the battery charge-discharge warm-up control, the battery warm-up control can be started after the battery 5 is continuously charged to increase the SOC while increasing the battery temperature $T_B$, and the battery warm-up control can further increase the battery temperature $T_B$ to recover the charge-discharge performance of the battery 5.

Moreover, because a sufficient SOC of the battery 5 has been attained when vehicle travel is started, it is possible to appropriately meet requirements in travel using the electric motor 3.

Although the present embodiment has been described, the present invention is not limited to the above described embodiment. For example, although in the above described embodiment, the present invention is applied to the hybrid electric vehicle provided with the dual-clutch transmission 2 with the six forward gears, the transmission 2 is not limited to this type. For example, the gears constituting the odd-number gear mechanism G1 and the even-number gear mechanism G2, arrangement of the gears, and shifting mechanisms of the gears may be arbitrarily changed.

Moreover, an ordinary transmission may be used in place of the dual-clutch transmission 2. In this case, when the vehicle is at a standstill in the P range or the N range, and the battery temperature $T_B$ is normal, a clutch (corresponding to the clutch C2 in the present embodiment) is disengaged to reduce engine load, and on the other hand, when the battery temperature $T_B$ is low, the clutch is engaged to carry out the battery warm-up control.

Explanation Of Reference Signs
 1 Engine
 2 Transmission
 3 Electric motor
 5 Battery
 21 ECU (battery remaining capacity detecting unit, battery warm-up control unit)
 31 Temperature sensor (battery temperature detecting unit)
 G1 Odd-number gear mechanism (first shifting mechanism)

G2 Even-number gear mechanism (second shifting mechanism)
C1 Clutch (wet clutch, first clutch)
C2 Clutch (wet clutch, second clutch)

The invention claimed is:

1. A hybrid electric vehicle comprising:
a wet clutch device configured to establish and interrupt connection between an engine and an electric motor both serving as a traveling power source;
a transmission capable of being switched between a driving range in which driving force of the traveling power source can be transmitted to driving wheels and a non-driving range in which transmission of the driving force to the driving wheels is interrupted;
a battery configured to supply electrical power to the electric motor acting as a motor and to be charged by the electric motor acting as a generator, and in which the wet clutch device is kept disengaged while the vehicle is at a standstill with the transmission switched to the non-driving range; and
a battery warm-up apparatus for warming up the battery comprising
a battery temperature detecting unit configured to detect a temperature of the battery; and
a battery warm-up control unit configured to, when determining that the temperature of the battery detected by the battery temperature detecting unit is less than a predetermined warm-up determination value while the vehicle is at a standstill with the transmission switched to the non-driving range,
switch the wet clutch device into engaged state to connect the engine and the electric motor together, and
vary driving force of the electric motor alternately to a positive side and a negative side so as to repeatedly charge and discharge the battery,
wherein the wet clutch device includes a first clutch and a second clutch connected in parallel to the engine;
wherein the transmission is a dual-clutch transmission including a first shifting mechanism and a second shifting mechanism connected to the first clutch and the second clutch, respectively;
wherein the electric motor is interposed between the second clutch and the second shifting mechanism;
wherein when the vehicle is at a standstill with the transmission switched to the non-driving range, the first clutch and the second clutch are held in disengaged state; and
wherein when the temperature of the battery is judged to be less than the warm-up determination value while the vehicle is at a standstill with the transmission switched to the non-driving range, the battery warm-up control unit switches only the second clutch to engaged state and varies the driving force of the electric motor to the positive side and the negative side.

2. The hybrid electric vehicle according to clam 1, further comprising:
a battery remaining capacity detecting unit configured for detecting a remaining capacity of the battery,
wherein, when the remaining capacity of the battery detected by the battery remaining capacity detecting unit is judged to be less than a lower limit determination value set in advance, the battery warm-up control unit prohibits the driving force of the electric motor from varying to the positive side, and continuously controls the driving force of the electric motor to the negative side to charge the battery.

3. A method for operating a battery warm-up apparatus of a hybrid electric vehicle, the method comprising:
establishing and interrupting, by a wet clutch device, a connection between an engine and an electric motor both serving as a traveling power source;
switching a transmission between a driving range in which driving force of the traveling power source can be transmitted to driving wheels and a non-driving range in which transmission of the driving force to the driving wheels is interrupted;
supplying, by a battery, electrical power to the electric motor acting as a motor and to be charged by the electric motor acting as a generator;
maintaining the wet clutch device disengaged while the vehicle is at a standstill with the transmission switched to the non-driving range;
detecting, by a battery temperature detecting unit, a temperature of the battery,
wherein when the temperature of the battery detected by the battery temperature detecting unit is less than a predetermined warm-up determination value while the vehicle is at a standstill with the transmission switched to the non-driving range, a battery warm-up control unit
switches the wet clutch device into engaged state to connect the engine and the electric motor together, and
varies driving force of the electric motor alternately to a positive side and a negative side so as to repeatedly charge and discharge the battery,
wherein the wet clutch device includes a first clutch and a second clutch connected in parallel to the engine;
wherein the transmission is a dual-clutch transmission including a first shifting mechanism and a second shifting mechanism connected to the first clutch and the second clutch, respectively;
wherein the electric motor is interposed between the second clutch and the second shifting mechanism;
wherein when the vehicle is at a standstill with the transmission switched to the non-driving range, the first clutch and the second clutch are held in disengaged state; and
wherein when the temperature of the battery is judged to be less than the warm-up determination value while the vehicle is at a standstill with the transmission switched to the non-driving range, the battery warm-up control unit switches only the second clutch to engaged state and varies the driving force of the electric motor to the positive side and the negative side.

4. The method according to clam 3, further comprising:
detecting, by a battery remaining capacity detecting unit, a remaining capacity of the battery,
wherein, when the remaining capacity of the battery detected by the battery remaining capacity detecting unit is judged to be less than a lower limit determination value set in advance, the battery warm-up control unit prohibits the driving force of the electric motor from varying to the positive side, and continuously controls the driving force of the electric motor to the negative side to charge the battery.

* * * * *